(12) United States Patent
Yamazaki

(10) Patent No.: US 9,258,504 B2
(45) Date of Patent: Feb. 9, 2016

(54) SEMICONDUCTOR DEVICE, METHOD OF CONTROLLING THE SAME, AND CAMERA BASED ON REFERENCE COMPARISON

(71) Applicant: CANON KABUSHIKI KAISHA, Tokyo (JP)

(72) Inventor: Tatsuhiko Yamazaki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 13/932,171

(22) Filed: Jul. 1, 2013

(65) Prior Publication Data

US 2014/0022407 A1    Jan. 23, 2014

(30) Foreign Application Priority Data

Jul. 23, 2012    (JP) .................................. 2012-163071

(51) Int. Cl.
*H04N 5/232*    (2006.01)
*H04N 5/353*    (2011.01)
*H04N 5/376*    (2011.01)

(52) U.S. Cl.
CPC ......... *H04N 5/3765* (2013.01); *H04N 5/23212* (2013.01); *H04N 5/353* (2013.01)

(58) Field of Classification Search
CPC ... H04N 5/3559; H04N 5/2178; H04N 5/353; H04N 5/355; H04N 5/35572; H04N 5/37457; H04N 5/374; H04N 3/1506; H04N 5/2353
USPC ................. 348/247, 301, 302, 297, 350, 362; 396/96, 128, 225
See application file for complete search history.

(56) References Cited

U.S. PATENT DOCUMENTS

| | | | | |
|---|---|---|---|---|
| 6,229,133 B1 * | 5/2001 | Hynecek | ..................... | 250/208.1 |
| 7,102,675 B1 * | 9/2006 | Tokunaga | ....................... | 348/297 |
| 7,460,779 B2 * | 12/2008 | Nakata | .............................. | 396/96 |
| 8,754,978 B2 * | 6/2014 | Hayashi et al. | ................ | 348/350 |
| 8,818,183 B2 * | 8/2014 | Yamazaki et al. | ............... | 396/96 |

FOREIGN PATENT DOCUMENTS

JP        11-150686 A        6/1999

* cited by examiner

*Primary Examiner* — Hung Lam
(74) *Attorney, Agent, or Firm* — Fitzpatrick, Cella, Harper & Scinto

(57) ABSTRACT

A semiconductor device comprises a plurality of units, each including a sensor unit which accumulates charges upon photoelectric conversion and a storage unit which stores information, and a control unit which controls each of the plurality of units, wherein the control unit sequentially performs, for each of the plurality of units, first operation of comparing a reference voltage with an output signal from the sensor unit based on the amount of accumulated charges and second operation of storing information based on the comparison result in the storage unit corresponding to the sensor unit if an output signal from the sensor unit reaches the reference voltage in the first operation, and the control unit is configured to be able to start the first operation for a next unit upon skipping the second operation and skips the second operation in a predetermined period.

12 Claims, 14 Drawing Sheets

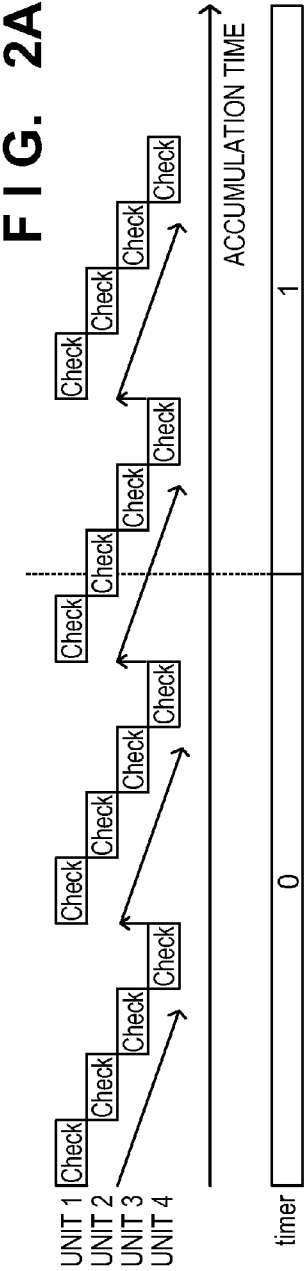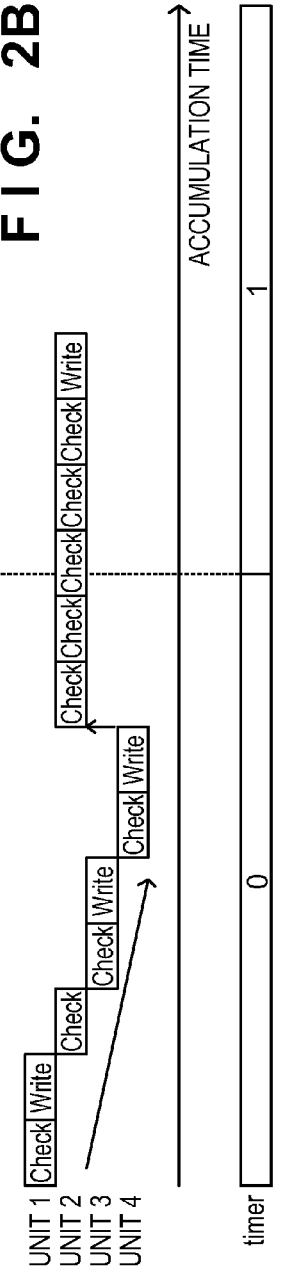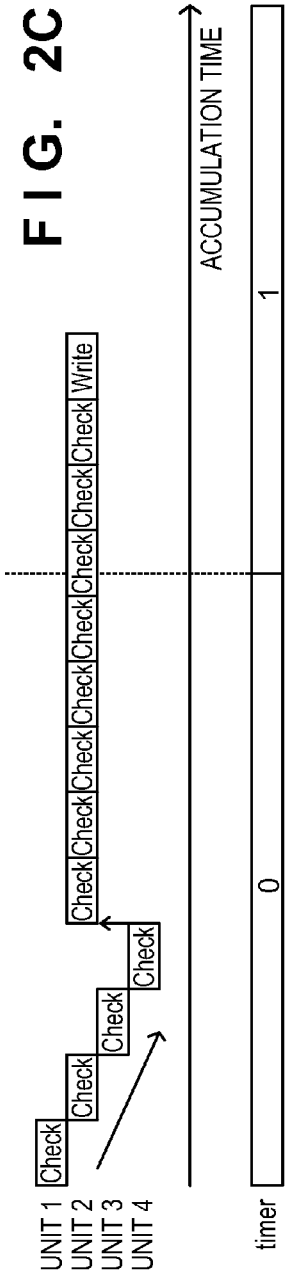

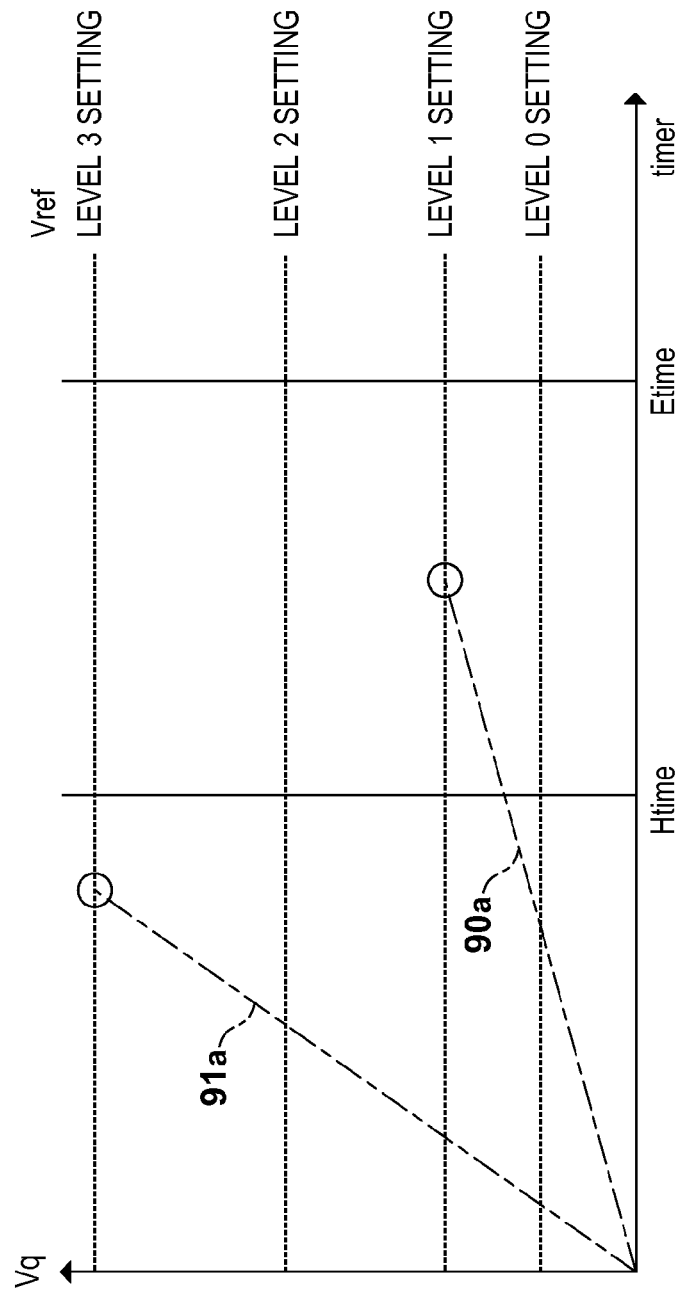

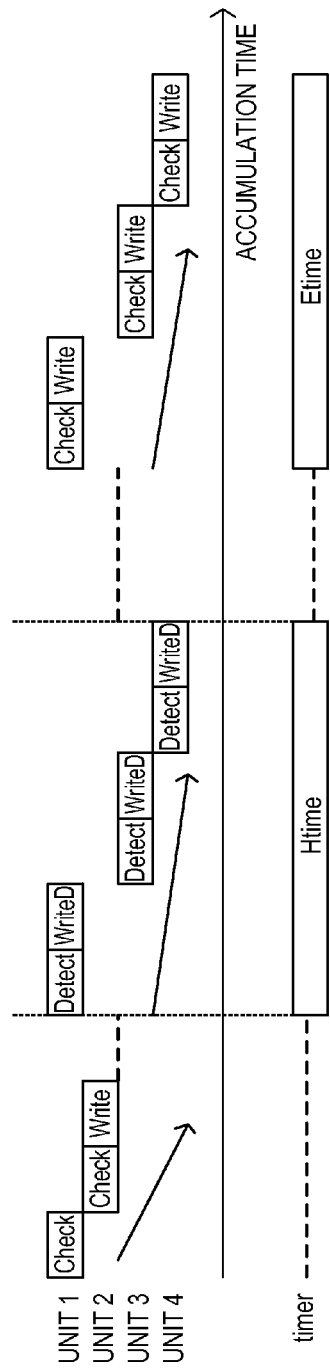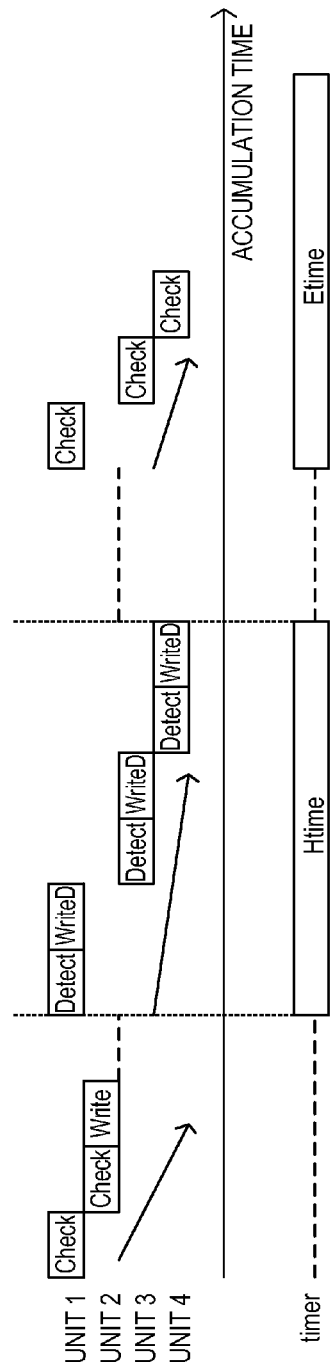

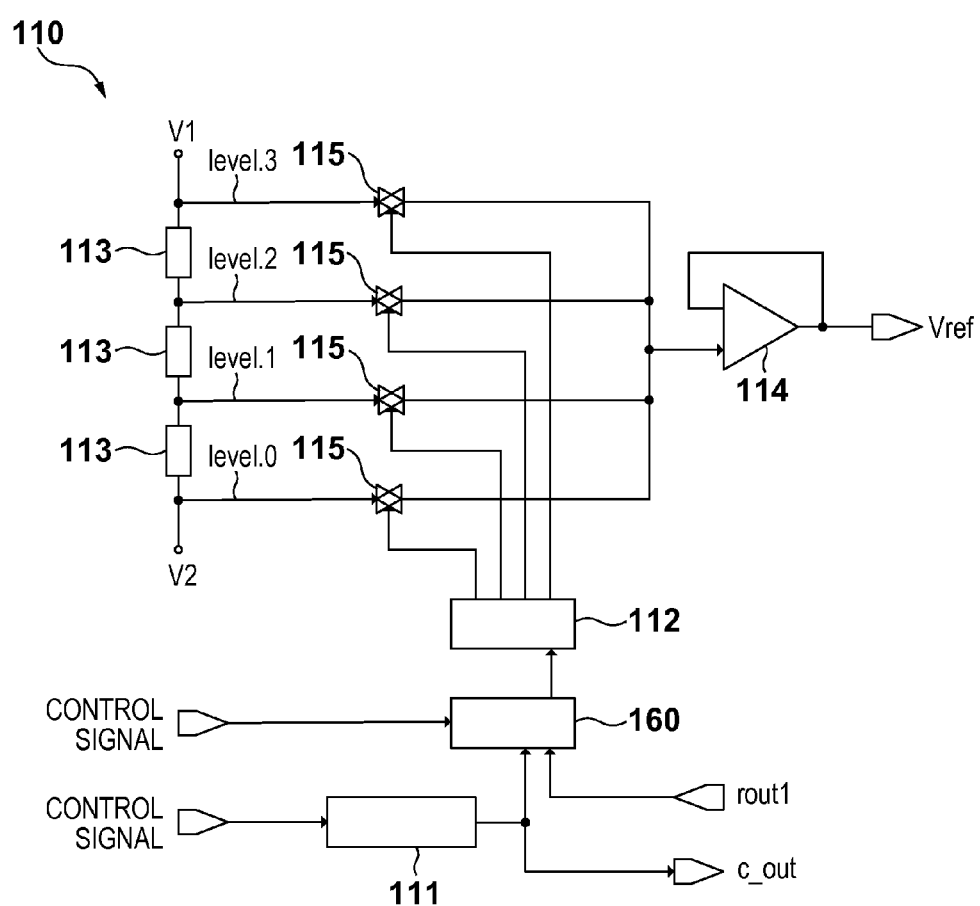
F I G. 11

SEMICONDUCTOR DEVICE, METHOD OF CONTROLLING THE SAME, AND CAMERA BASED ON REFERENCE COMPARISON

BACKGROUND OF THE INVENTION

1. Field of the Invention

The present invention relates to a semiconductor device, a method of controlling the same, and a camera.

2. Description of the Related Art

Japanese Patent Laid-Open No. 11-150686 discloses a photoelectric conversion apparatus including photoelectric conversion means including photoelectric conversion elements and storage means, and a control means for controlling the photoelectric conversion means. The control means controls the charge accumulating operation of the photoelectric conversion elements based on control information stored in the storage means. The control means generates control information based on the monitoring result of the charge accumulation state of each photoelectric conversion element at a predetermined timing, and stores the information in the storage means. A photoelectric conversion means is provided for each distance detection point for the detection of the focus of a camera. The above control makes it possible to perform appropriate focus detection in accordance with the luminance of an object.

Repeating the operation of monitoring photoelectric conversion elements and the operation of storing control information in storage units based on the monitoring results will lead to delays in the timing of starting monitoring the photoelectric conversion elements of the respective photoelectric conversion means. This will lead to insufficient frequency of monitoring the respective photoelectric conversion elements, and hence can cause a deterioration in monitoring accuracy.

SUMMARY OF THE INVENTION

The present invention has been made by the inventor upon recognition of the above problem, and provides a technique advantageous for improving the monitoring accuracy of the storage states of the photoelectric conversion elements of a plurality of photoelectric conversion means when sequentially controlling the respective photoelectric conversion means.

One of the aspects of the present invention provides a semiconductor device comprising a plurality of units, each including a sensor unit which accumulates charges upon photoelectric conversion and a storage unit which stores information, and a control unit which controls each of the plurality of units, wherein the control unit sequentially performs, for each of the plurality of units, first operation of comparing a reference voltage with an output signal from the sensor unit based on the amount of accumulated charges and second operation of storing information based on the comparison result in the storage unit corresponding to the sensor unit if an output signal from the sensor unit reaches the reference voltage in the first operation, and the control unit is configured to be able to start the first operation for a next unit upon skipping the second operation and skips the second operation in a predetermined period.

Further features of the present invention will become apparent from the following description of exemplary embodiments with reference to the attached drawings.

BRIEF DESCRIPTION OF THE DRAWINGS

FIGS. 2A to 2C are views for explaining an example of the content of the operation of a semiconductor device according to the first embodiment;

FIG. 6 is a graph for explaining the operation of the semiconductor device according to the first embodiment;

FIGS. 7A and 7B are views each for explaining an example of the content of the operation of a semiconductor device according to the second embodiment;

FIG. 11 is a circuit diagram for explaining an example of the arrangement of a reference setting unit 110.

DESCRIPTION OF THE EMBODIMENTS

First Embodiment

Figure 1:
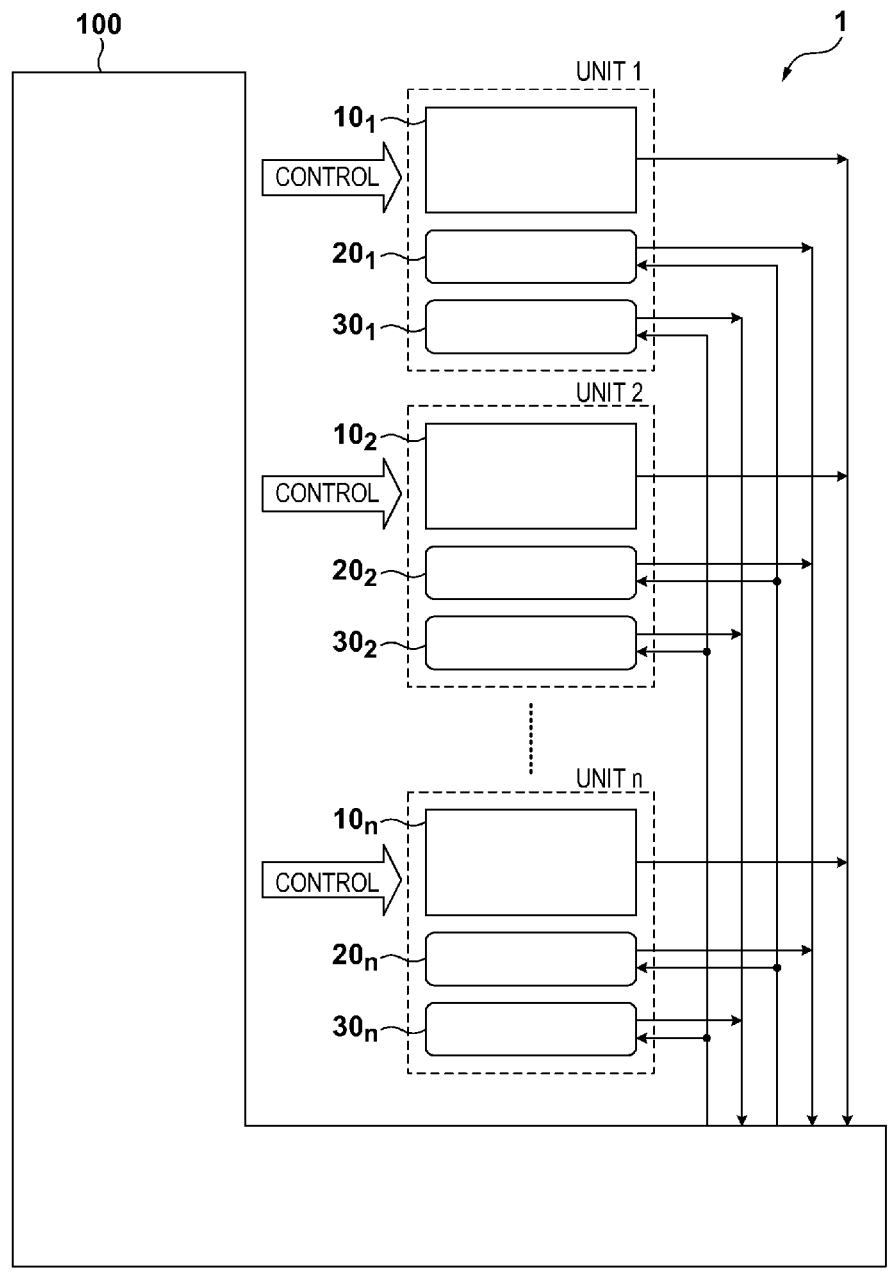
FIG. 1 is a block diagram for explaining an example of the arrangement of a semiconductor device.

FIG. 1 shows the schematic arrangement of a semiconductor device 1 according to the first embodiment. Referring to FIG. 1, the semiconductor device 1 includes a plurality of units k (k=1 to n) and a control unit 100 which controls them. Each unit k can be provided in correspondence with a distance detection point. The unit k includes a sensor unit $10_k$, a first storage unit $20_k$, and a second storage unit $30_k$. Referring to FIG. 1, the sensor unit $10_k$, the first storage unit $20_k$, and the second storage unit $30_k$ are arranged adjacent to each other. However, the sensor unit $10_k$, the first storage unit $20_k$, and the second storage unit $30_k$ may be arranged in accordance with a chip layout. For example, the sensor unit $10_k$, the first storage unit $20_k$, and the second storage unit $30_k$ may be formed by using different semiconductor chips as long as the control unit 100 manages them so as to form the unit k. The sensor unit $10_k$ can include a photoelectric conversion unit including a light-receiving element such as a photodiode, a reading unit which reads out output signals from the photoelectric conversion unit, and a charge holding unit which holds charges from the photoelectric conversion unit. The semiconductor device 1 can be applied to a focus detection apparatus such as a camera. The focus detection apparatus controls the accumulation time of charges generated by photoelectric conversion in the sensor unit in accordance with the luminance level of an object when performing focus detection processing.

The control unit 100 decides control information concerning a reference value (to be referred to as an accumulation end level) for the determination of the accumulation end of the sensor unit $10_k$, and stores the control information in the first storage unit $20_k$. The control unit 100 then accumulates charges in the sensor unit $10_k$ up to the accumulation end level based on the control information stored in the first storage unit $20_k$. In this case, the control unit 100 stores the time (accumulation time) required from the start to the end of accumulation as information concerning the luminance of the object in the second storage unit $30_k$. It is possible to set an accumulation time by measuring an elapsed time (a measured value will be referred to as a timer value) using a timer. This arrangement can appropriately control, for example, the charge accumulating operation of the sensor unit $10_k$ in accordance with an output from the sensor unit $10_k$ which has detected external input information (the amount of light received in this case).

First of all, the control unit 100 decides control information for controlling accumulating operation in accordance with the luminance level of an object. In the step of detecting the focus established afterward, the control unit 100 causes the sensor unit $10_k$ to accumulate charges up to the accumulation end level based on the control information stored in the first storage unit $20_k$, and stores the accumulation time in the second storage unit $30_k$. With regard to a unit which has not reached the accumulation end level even after the lapse of a predetermined period, the control unit 100 changes the accumulation end level by rewriting the corresponding control information to shorten the charge accumulation time. A calculation unit (e.g., a defocus amount detection unit (not shown)) which performs calculation processing can perform predetermined calculation processing for the output signal based on the amount of charges accumulated in this manner. This calculation result is then fed back to a focusing unit (e.g., a lens driving unit (not shown)) which performs focusing operation. This makes it possible to focus the lens.

An example of the above operation for each focus detection point in a case in which the luminance of an object is high will be described with reference to FIGS. 2A to 6. FIG. 2A to 2C show the content of the operation of the semiconductor device 1. FIG. 2A shows the content of the operation of each unit (how each unit performs processing with the lapse of time). The abscissa represents the time, and the ordinate represents the content of the processing by the unit k. In this case, for the sake of easy understanding, assume that the number of units is four (n=4, k=1 to 4). After starting accumulating operation, the device performs predetermined processing for units 1 to 4 in the order named. Upon completion of processing for unit 4, the process returns to processing for unit 1.

"Check" processing corresponds to the first operation and monitors the unit k. More specifically, the device determines whether an output signal from the sensor unit $10_k$ of the unit k, which corresponds to the amount of accumulated charges, has reached the accumulation end level based on the control information stored in the first storage unit $20_k$. If the output signal has reached the accumulation end level, the device terminates the accumulating operation of the unit k. The timer value plotted on the abscissa represents the time elapsed from the start of accumulating operation. The second storage unit $30_k$ stores this value when the unit k completes accumulation. Although the timer value increases with the lapse of time, each unit performs "Check" processing a plurality of times during the period of a certain timer value. That is, each unit performs "Check" processing in a sufficiently short period of time relative to the measurement of a timer value.

FIGS. 2B and 2C show the content of operation in a case in which the luminance of the object corresponding to units 1, 3, and 4 is high, units 1, 3, and 4 each have reached the accumulation end level within a period corresponding to timer value=0, and unit 2 has reached the accumulation end level within a period corresponding to timer value=1.

FIG. 2B shows operation in a comparative example, in which an output from the sensor unit in each of units 1, 3, and 4 has reached the accumulation end level in the first "Check" processing, and the device performs "Write" processing immediately after the "Check" processing. "Write" processing corresponds to the second operation, in which the second storage unit $30_k$ stores the timer value at the time of the "Check" processing performed immediately before the second operation. In this case, with the "Write" processing, second storage units $30_1$, $30_3$, and $30_4$ each store the timer value "0". Thereafter, the device performs "Check" processing in the same manner for unit 2 for which "Write" processing has not been performed, thereby storing the timer value "1" at the time of determining the end of accumulation in the second storage unit $30_2$.

In this case, according to this scheme, performing "Write" processing will make (delay) the time of performing "Check" processing for units 2 to 4 come after that in the case shown in FIG. 2A. That is, the start timing of sequentially monitoring the respective units delays. For example, this may cause the problem that when the luminance of an object is high, "Check" processing cannot follow an increase in the amount of accumulated charges, and hence an output signal from the sensor unit which should be obtained is saturated. As a result, a portion with a high light intensity is lost as calculation information for a defocus amount. This may cause a deterioration in focus detection accuracy.

FIG. 2C shows a case in which units 1, 3, and 4 have reached the accumulation end level in the first "Check" processing, as described above. In this case, the device does not perform "Write" processing for any unit k until the lapse of a predetermined period. That is, this scheme skips "Write" processing until the lapse of timer value=0, and does not cause the above delay with respect to the time of performing "Check" processing for each unit k. This can therefore improve the focus detection accuracy. In "Check" processing for unit 2, although an output from the sensor unit of unit 2 has not reached the accumulation end level, the device will perform "Write" processing afterward when the output reaches the accumulation end level.

Figure 3:
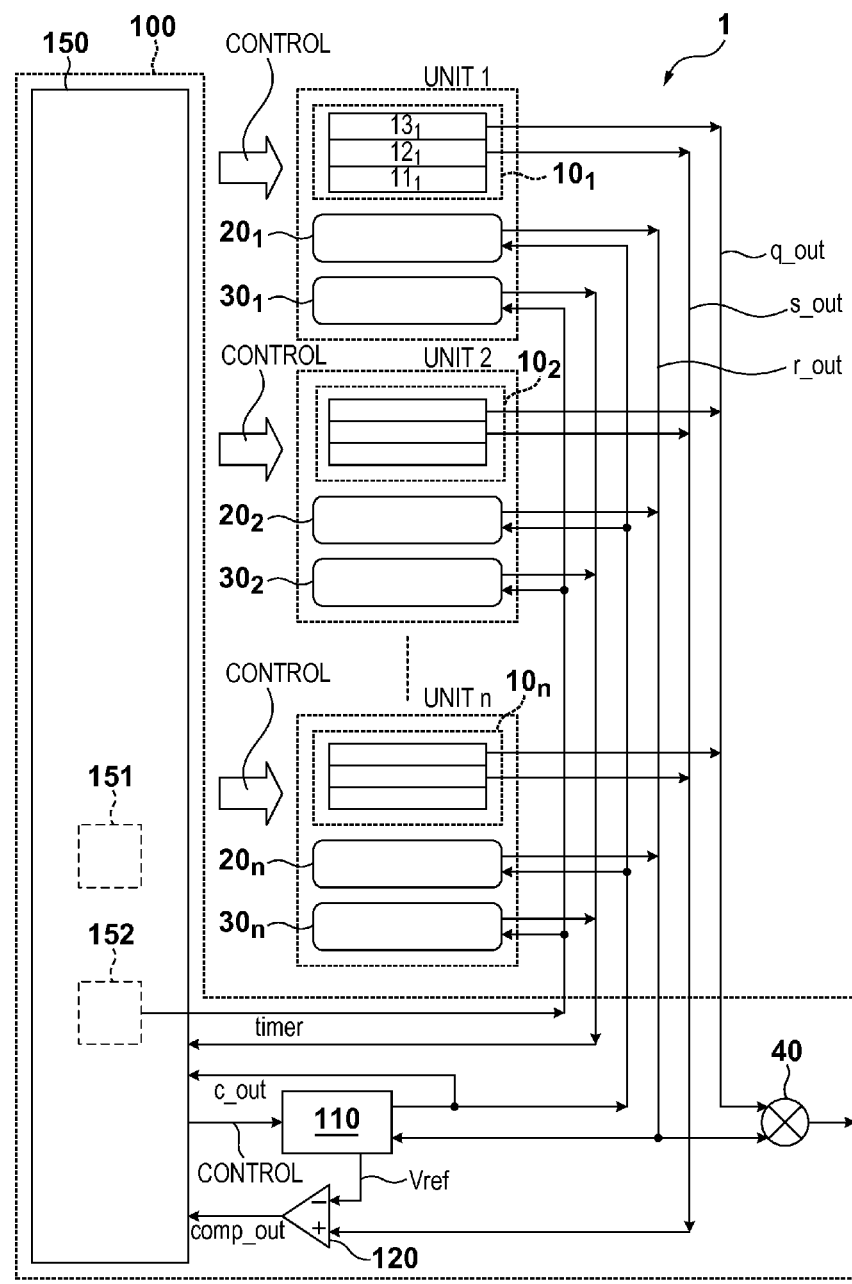
FIG. 3 is a block diagram for explaining a concrete example of the arrangement of a semiconductor device according to the first embodiment.

FIG. 3 is a block diagram for explaining a concrete example of the arrangement of the semiconductor device 1. The sensor unit $10_k$ can include, for example, a photoelectric conversion unit $11_k$ which outputs a signal in accordance with the amount of charges accumulated by accumulating operation, a reading unit $12_k$ which reads out an output signal from the photoelectric conversion unit $11_k$, and a charge holding unit $13_k$ which holds the charges accumulated in the photoelectric conversion unit $11_k$. The control unit 100 can include, for example, a controller 150, an amplification unit 40, a reference setting unit 110, and a comparison unit 120. The amplification unit 40 amplifies the signal output from the sensor unit $10_k$ and outputs the resultant signal. The reference setting unit 110 outputs, to the comparison unit 120, a reference voltage Vref (potential is Vref0 to Vref3) for comparison with the output signal from the reading unit $12_k$. The comparison unit 120 compares the reference voltage Vref with an output signal from the reading unit $12_k$. The controller 150 issues an operation instruction to each block in accordance with a signal from each block.

The first storage unit $20_k$ and second storage unit $30_k$ of the unit k may be formed with, for example, the same addresses in one SRAM. More specifically, with single address control, the controller 150 can simultaneously store information in the first storage unit $20_k$ and the second storage unit $30_k$ or simultaneously read out information from them by selecting an address corresponding to the unit k. More specifically, assume that an SRAM corresponding to n addresses is prepared, and 16 bits are assigned to one address. In this case, for example, it is possible to assign 2 bits to the first storage unit $20_k$, and 14 bits to the second storage unit $30_k$.

In the unit k, the photoelectric conversion unit $11_k$ is constituted by, for example, a pair of sensor arrays (or sensor areas) each having a plurality of pixels, and can include about 30 to 80 pixels. One and the other of a pair of sensor arrays output two data based on an image of an object. The semiconductor device 1 can perform focus detection by a phase-difference detection scheme by using the two data. Upon detecting the amount of charges accumulated in the photoelectric conversion unit $11_k$, the reading unit $12_k$ outputs a peak signal of outputs from a plurality of pixels of the photoelectric conversion unit $11_k$. In this case, the reading unit $12_k$ may detect a bottom signal together with the peak signal and use a peak/bottom signal obtained from the difference between them. This output result can be output as a signal s_out to the comparison unit 120 in accordance with an instruction from the controller 150. The charge holding unit $13_k$ temporarily holds the charges accumulated in the photoelectric conversion unit $11_k$ as a pixel signal q_out. The pixel signal q_out is output to the amplification unit 40 in accordance with an instruction from the controller 150.

The first storage unit $20_k$ stores control information concerning the accumulation of charges in the photoelectric conversion unit $11_k$ in accordance with an instruction from the controller 150. Upon completion of accumulating operation, the device stores the determination result in the first storage unit $20_k$. This control information may be 2-bit information ("0" to "3") as in this embodiment. The control information is output to the reference setting unit 110 and the amplification unit 40 in accordance with an instruction from the controller 150.

As exemplified by FIG. 11, the reference setting unit 110 includes a counter 111, a selector 160, a decoder 112, a plurality of resistive elements 113, an amplifier 114, and a plurality of switches 115. The counter 111 is used when the comparison unit 120 compares the reference voltage Vref from the amplifier 114 with an output signal from the reading unit $12_k$. The selector 160 can select either a measurement result c_out from the counter 111 or control information rout1 from the first storage unit $20_k$. The decoder 112 generates a control signal for selecting the potential of the reference voltage Vref based on an output from the selector 160. The amplifier 114 outputs the reference voltage Vref generated by these control signals and the resistive elements 113.

The reference setting unit 110 uses the control information rout1 stored in the plurality of first storage units $20_k$ to select the potential of the reference voltage Vref by using the switches 115 based on the decoding result obtained by the decoder 112. The reference setting unit 110 outputs the reference voltage Vref to the comparison unit 120 to certify the output level of an output signal from the reading unit $12_k$. The reference setting unit 110 outputs the measurement result c_out obtained by the counter 111. The measurement result c_out is stored in the first storage unit $20_k$ selected in accordance with an instruction from the controller 150. The comparison unit 120 compares the reference voltage Vref with the signal s_out read out from the reading unit $12_k$, and outputs a comparison result comp_out to the controller 150. In this embodiment, if s_out≥Vref, then comp_out=Hi.

The amplification unit 40 amplifies and outputs the output signal q_out from the change holding unit $13_k$ in accordance with the amplification factor set by the first storage unit $20_k$. The controller 150 communicates with these functional blocks and issues operation instructions in accordance with an execution program. A program memory 151 included in the controller 150 shown in FIG. 3 may store the execution program.

Figure 4A:
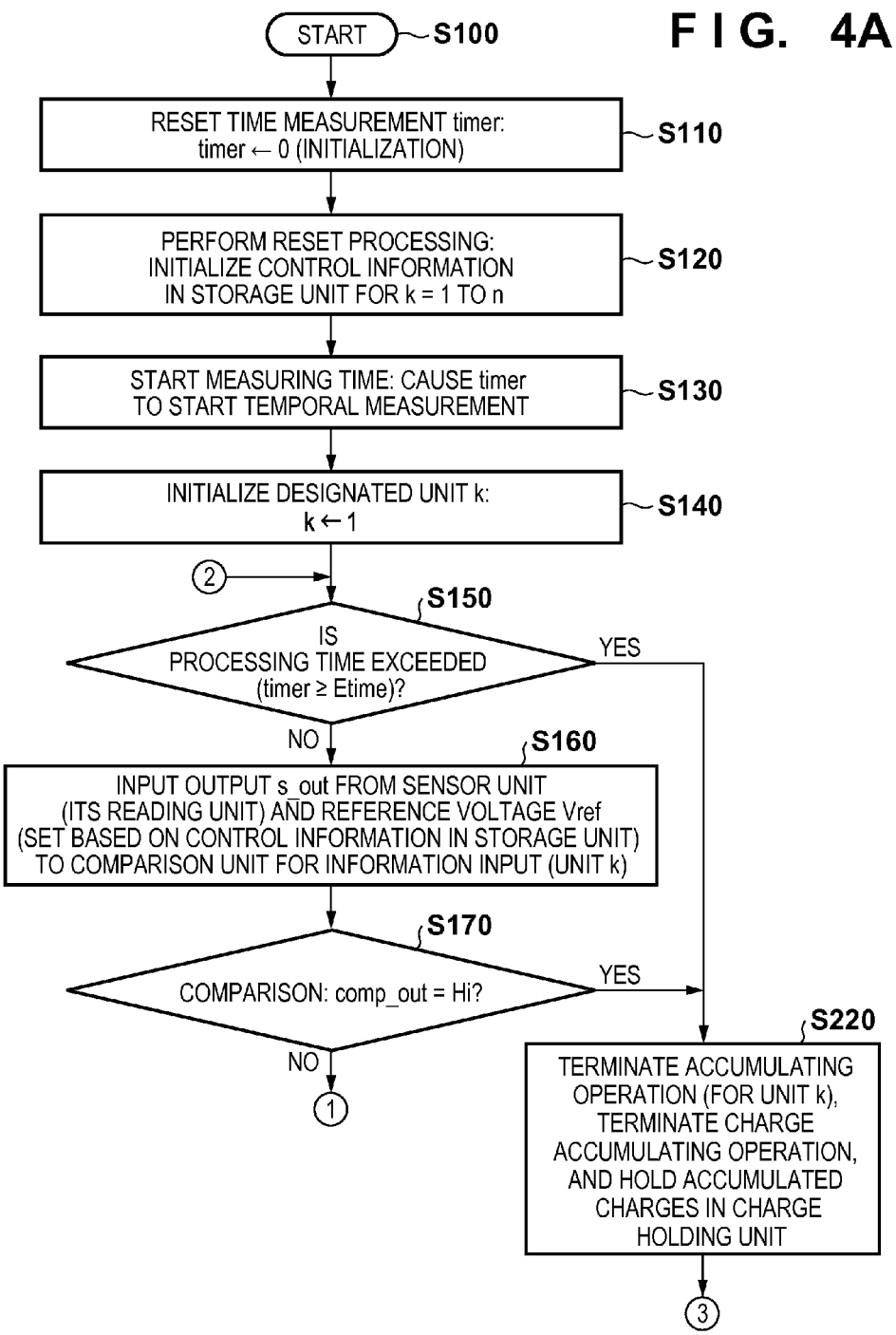
FIGS. 4A and 4B are flowcharts for explaining an example of the operation of the semiconductor device according to the first embodiment.

Each operation of the semiconductor device 1 will be described next with reference to the flowchart of FIGS. 4A and 4B. First of all, the device starts this execution program in step S100 (in the following description, each step will be simply indicated by a symbol alone). In S110, the device initializes a value timer (timer=0) in a timer 152 (included in, for example, the controller 150). In S120, the device performs reset processing in accordance with the flowchart shown in FIG. 5A (S120 to S126). First of all, the device resets the charges accumulated in the photoelectric conversion unit $11_k$ in accordance with an instruction from the controller 150 (S121). Thereafter, the device starts accumulating charges. In S122, the device initializes each unit to be selected and control information stored in the storage unit $20_k$ (for example, "3" (S123)), and stores the control information in the storage units $20_k$ of all the units. In addition, the second storage unit $30_k$ stores the initialized value (timer=0) of the timer 152 (S124, S125, S126). Control information "3" as this initial value may be stored from the output c_out from the counter 111 (FIG. 11) in accordance with an instruction from the controller 150 as in this embodiment.

In S130, the timer 152 starts measuring an elapsed time (adding timer values at predetermined time intervals). In S140, the device initializes the value (k=1) in a register (not shown) which designates the unit k. In S150, the controller 150 refers to the timer value to determine whether it exceeds an upper limit value Etime (corresponding to the second time) of preset charge accumulation times. If timer≥Etime, the process advances to S220. If timer<Etime, the process advances to S160. In S160, the comparison unit 120 receives the output s_out from the reading unit $12_k$ and the reference voltage Vref based on the control information stored in the first storage unit $20_k$ in the unit k in accordance with an instruction from the controller 150. In S170, the comparison unit 120 compares s_out set in S160 with Vref. At this time, if output comp_out=Hi (s_out≥Vref) from the comparison unit 120, the process advances S220 (to be described later). If comp_out=Low (s_out<Vref), the process advances to S180. In S180, the controller 150 refers to a timer value to determine whether it is equal to a preset half determination time (half time Htime equal to the first time). Htime may be a time which comes after timer=0 and suitable for checking a charge accumulation state, and may be, for example, a half time before the end time Etime at which accumulating operation is forcibly terminated. If timer=Htime, the process advances S190. If timer≠Htime, the process advances to S200 (to be described later). In S190, the controller 150 sets again control information in the photoelectric conversion unit $11_k$ of the unit k based on the amount of accumulated charges up to this time point to shorten the accumulation time, and stores the information in the first storage unit $20_k$. This control information allows the device to determine how much charges have been accumulated in the photoelectric conversion unit $11_k$, based on the reference voltage Vref output from the reference setting unit 110 in accordance with an instruction from the controller 150 and the result obtained by the comparison unit 120.

Figure 5A:
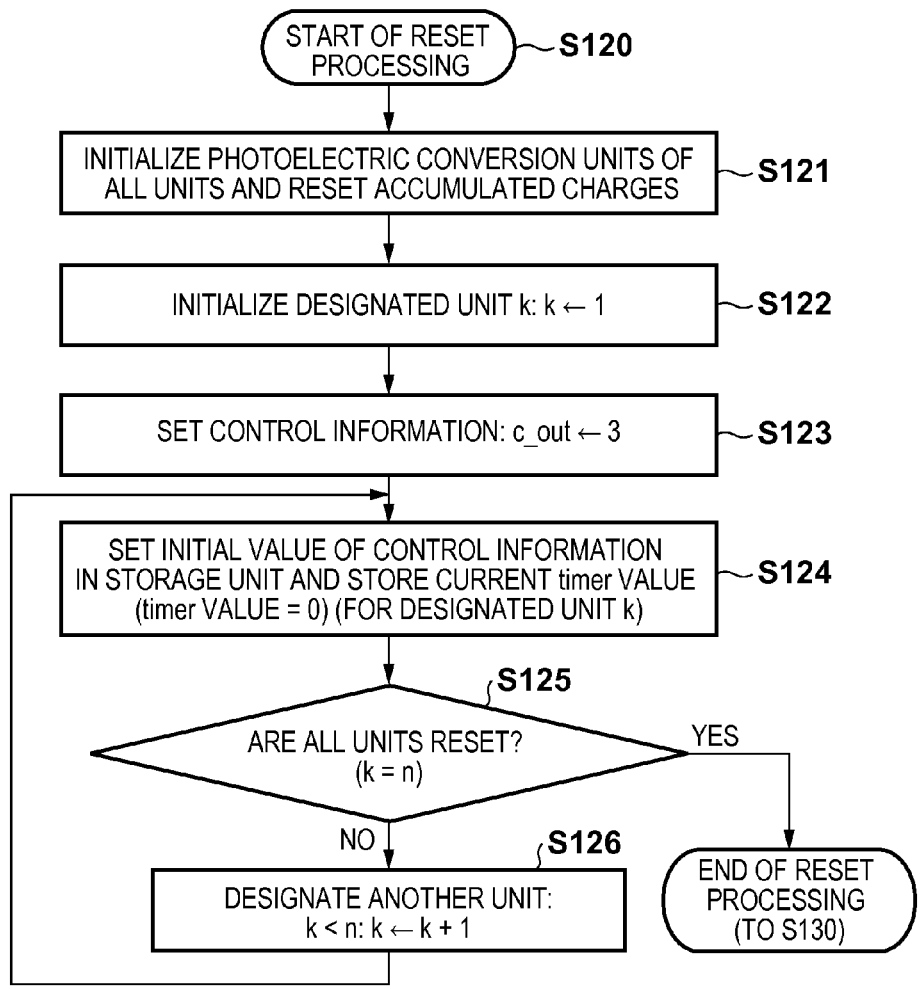
FIGS. 5A and 5B are flowcharts each for explaining part of the operation of the semiconductor device according to the first embodiment.
Figure 5B:
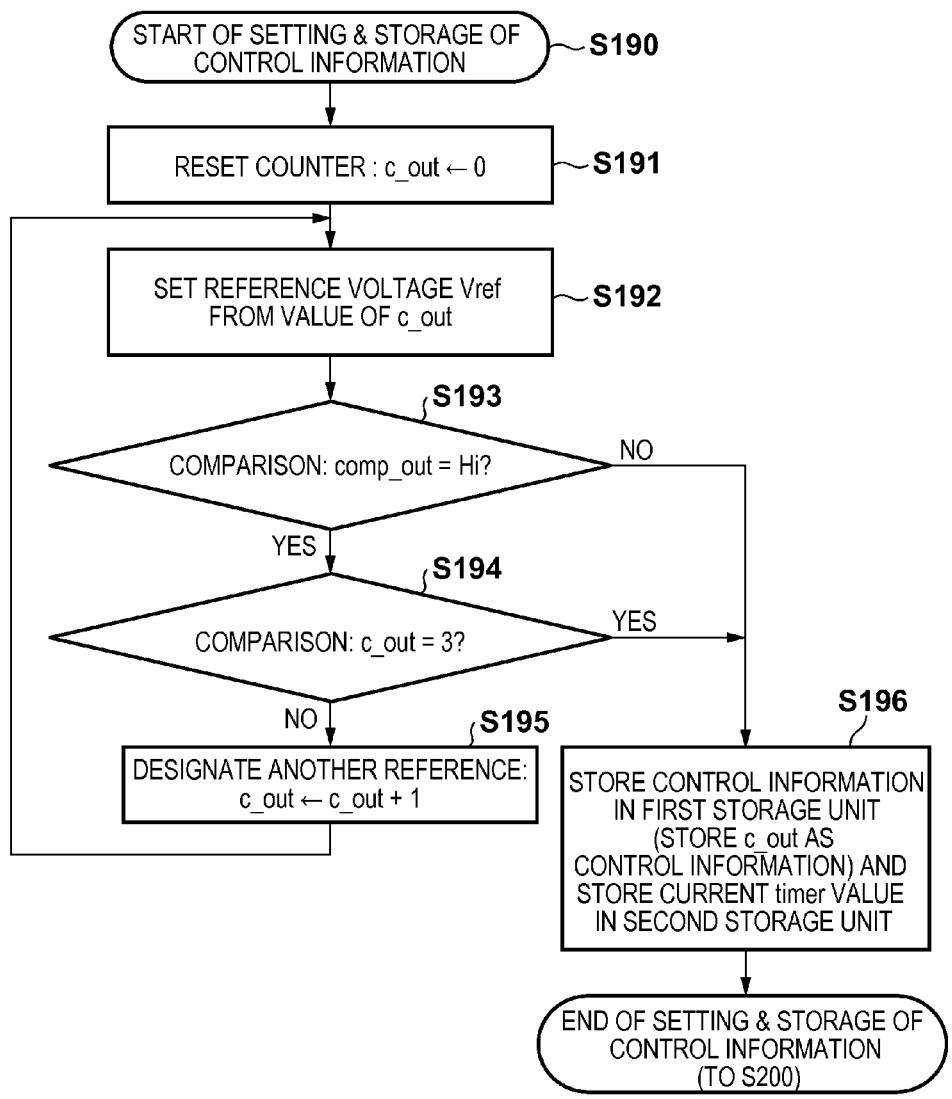

Operation in S190 is implemented by a program based on the flowchart shown in FIG. 5B. This operation will be described together with the plot indicating the concrete operation shown in FIG. 6. FIG. 6 is a plot, with the abscissa representing timer, and the ordinate representing an output potential Vq corresponding to the amount of charges accumulated in the photoelectric conversion unit $11_k$. Referring to FIG. 6, a dashed line 90a indicates a case in which the object is dark, and a dashed line 91a indicates a case in which the object is sufficiently bright.

In the case indicated by the dashed line 90a, when timer=Htime, the device performs operation in S190. In S191, the device resets the output c_out from the counter 111 (c_out=0) in accordance with an instruction from the controller 150. In S192, the device sets the reference voltage Vref in accordance with the value of c_out. The device sets the reference voltage Vref at this time by causing the selector 160 to select c_out in accordance with an instruction from the controller 150. If, for example, c_out=2, the device sets the reference voltage Vref to "level 2". In S193, the comparison unit 120 compares Vq with Vref. If output comp_out=Low (Vq<Vref) from the comparison unit 120, the process advances to S196. If comp_out=Hi (Vq≥Vref), the process advances to S194. In S194, the controller 150 determines whether the reference voltage Vref is set to "level 3" (c_out=3). If the reference voltage Vref is "level 3" (c_out=3), the process advances to S196. If the reference voltage Vref is not "level 3" (c_out≠3), the process advances to S195. In S195, the device sets the reference voltage Vref to one level up (add +1 to the value of c_out) in accordance with an instruction from the controller 150. The process then returns to S192. The device repeats the same procedure until Vq≥Vref in S193 and the process advances to S196, or until the reference voltage Vref is set to "level 3" (c_out=3) in S194 and the process advances to S196. In S196, the device sets control information in accordance with the reference voltage Vref set in S193 or S194. That is, the first storage unit $20_k$ stores the value of c_out at this time as control information in accordance with an instruction from the controller 150. In the case indicated by dashed line 90a, therefore, the first storage unit $20_k$ stores c_out=1 as control information in S190 to S196 described above. Although the second storage unit $30_k$ simultaneously stores the time at this time point, that is, the time (Htime) of intermediate determination, the store unit stores the accumulation end time again at the accumulation end time.

In the case indicated by the dashed line 91a, since Vq reaches the reference voltage Vref at "level 3" when timer<Htime and the process advances to S220 after S170, the device does not perform the operation in S190. This is because, since the arbitrary storage unit $20_k$ stores the initialized control information "3" by the reset processing (S120) shown in FIG. 4A, the reference voltage Vref is set to the potential "level 3" in accordance with the control information "3" in S160.

Figure 4B:
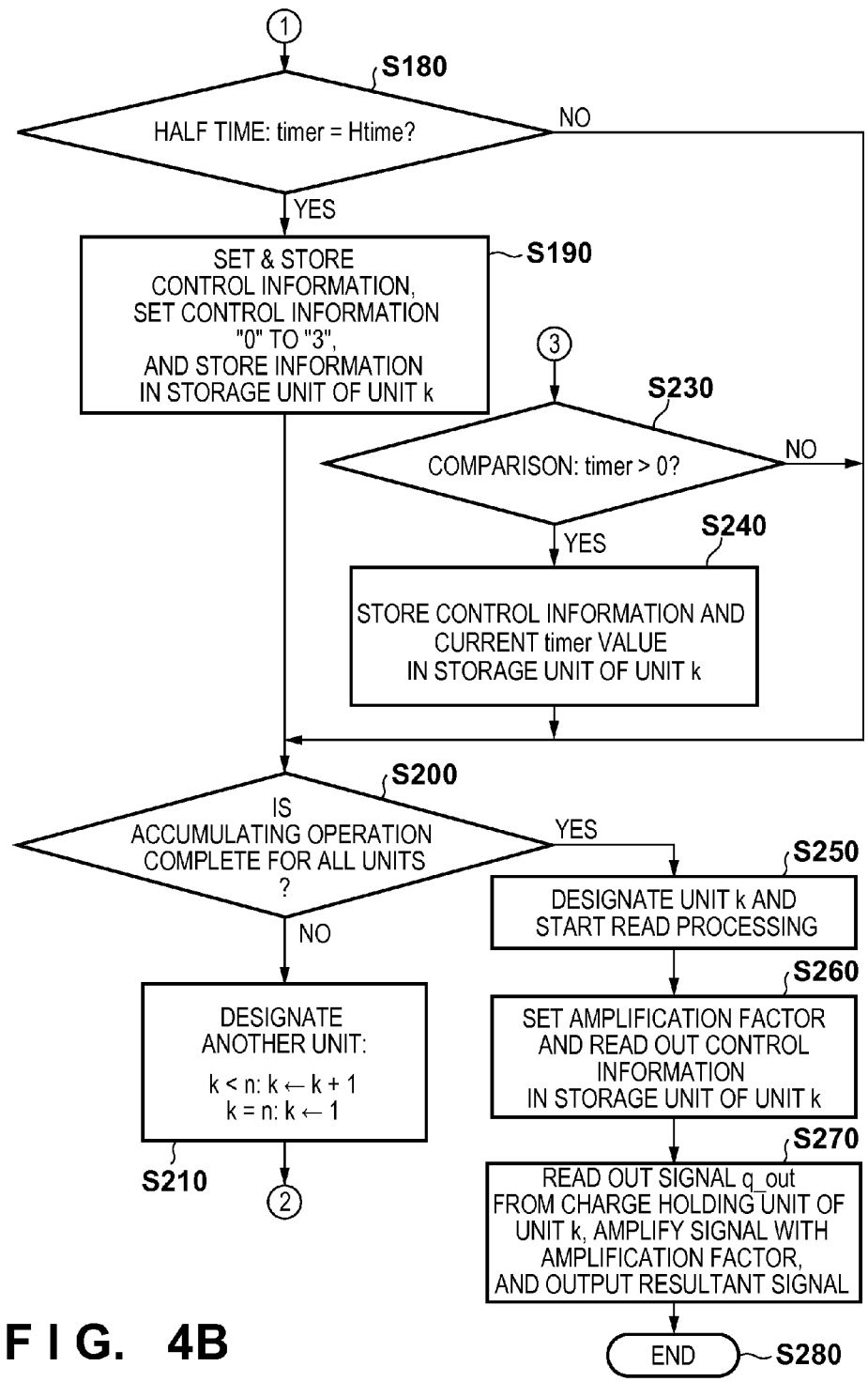

In S200 in FIG. 4B, the controller 150 determines whether the processing in S220 has been done for all the units k. If the processing in S220 has been done for all the units k, the process advances to S250 (to be described later). If this processing has not been done, the process advances to S210. In S210, the device designates the next unit k. The process then returns to the operation in S150. More specifically, if k<n, the device designates the next unit k (adds +1 to the value of k). If k=n, the device resets k=1 and designates the next time (for example, adds +1 to the timer value).

In S220, the controller 150 terminates charge accumulating operation in the photoelectric conversion unit $11_k$ of the unit k, and at the same time, temporarily holds the accumulated charges as the pixel signal q_out in the charge holding unit $13_k$. In S230, if timer>0 upon referring to the timer value at the end of accumulating operation in S220, the device stores the timer value in the second storage unit $30_k$ in S240. The process then advances to S200. If timer=0 in S230, the device skips S240, and the process advances to S200. In S210 described above, a unit which has already completed accumulating operation is sometimes designated as the new unit k. In this case, the device does not perform the processing in S220 to S240.

S250 corresponds to operation performed by the controller 150 after the execution of S220 for all the units k. In this operation, the device reads out the pixel signal q_out from the arbitrary charge holding unit $13_k$. In S260, the device reads out control information stored in the first storage unit $20_k$ and sets an amplification factor. At this time, it is possible to set control information again (not shown) in S190 shown in FIG. 5B to check the validity of the control information set in S190 prior to execution of S260. In S270, the device amplifies the pixel signal q_out read out in S250 with the amplification factor set in S260 and outputs the amplified signal. In S280, it is possible to terminate a series of operations and implement the function.

As described above, the semiconductor device 1 skips the step of storing information concerning the accumulation time in the second storage unit $30_k$ at the end of accumulating operation if the value of the timer 152 is equal to the reset value "0". The semiconductor device 1 executes the operation shown in FIG. 2C and improves the focus detection accuracy.

Second Embodiment

The second embodiment will exemplify the operation of a semiconductor device 1' in a case in which the luminance of an object is low will be described with reference to FIGS. 7A to 10. As exemplified by FIG. 1, the semiconductor device 1' has the same arrangement as that of the first embodiment. Like FIGS. 2A to 2C, FIGS. 7A and 7B show the content of the operation of the semiconductor device 1'. "Check" processing and "Write" processing in FIGS. 7A and 7B are the same as those in FIGS. 2A to 2C. "Detect" processing and "Write" processing will be described below.

"Detect" processing is the processing of changing a reference voltage Vref to a value corresponding to the luminance of an object with respect to the unit k to be monitored, when the timer value reaches Htime. More specifically, for example, in a case in which the luminance of an object is low, if a signal corresponding to the amount of accumulated charges does not reach a reference voltage Vref (does not complete accumulating operation) even when the timer value reaches Htime, the new reference voltage Vref is set for the corresponding unit k. The reference voltage Vref to be set can be set to, for example, a potential Vref2 (Vref2<Vref3). In this manner, the semiconductor device 1' shortens the time required for charge accumulation afterward, and performs appropriate processing in accordance with the luminance. Assume that Vref2 is a value smaller than the initial value of Vref3. "WriteD" processing is the processing of storing information concerning a set (selected) reference voltage in a first storage unit $20_k$. At the same time with this processing, a second storage unit $30_k$ stores the timer value at this time point.

The operation exemplified by FIGS. 7A and 7B will be described below. In this case, unit 2 has terminated accumulating operation before the timer value reaches Htime. For units 1, 3, and 4, the luminance of an object is low, and "Detect" processing has been performed when the timer value reaches Htime, while the new reference voltage Vref has been set. In this case, in these sensor units, no charge has been accumulated until the new reference voltage Vref is set, while the timer value has reached Etime to forcibly terminate the accumulating operation.

FIG. 7A shows the operation of a reference example, in which when the timer value reaches Etime, the device performs "Write" processing for units 1, 3, and 4, and stores the timer value (Etime) at this time point in a second storage unit 30$_k$. That is, this operation delays the timing of sequentially monitoring the respective units, and also delays the operation end time of the reference example when the luminance of the object is low. In contrast, FIG. 7B shows the operation of this embodiment, in which the device has not performed "Write" processing for units 1, 3, and 4 when the timer value reaches Etime, and has terminated the accumulating operation earlier than in the reference example.

Figure 8:
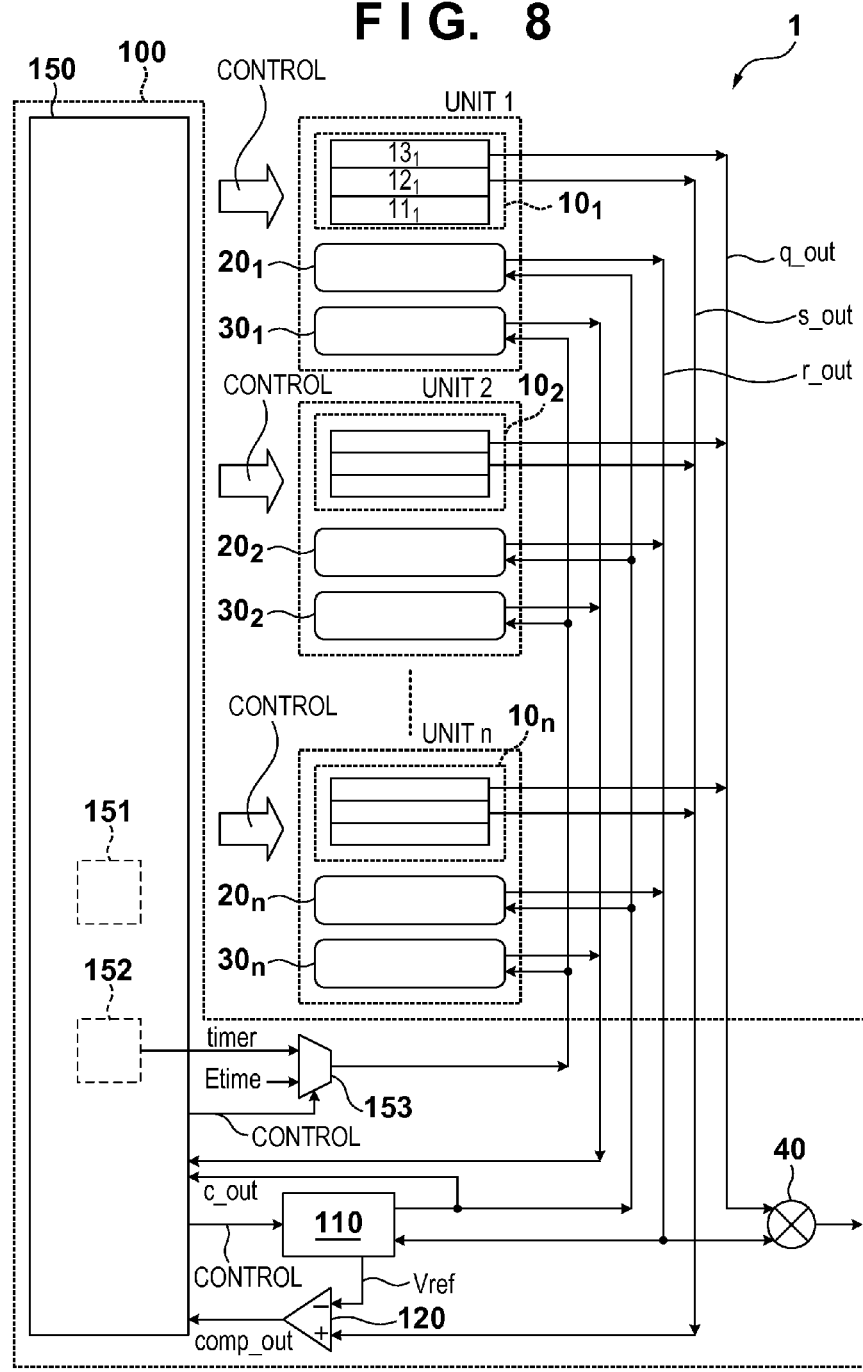
FIG. 8 is a block diagram for explaining a concrete example of the arrangement of the semiconductor device according to the second embodiment.
Figure 9A:
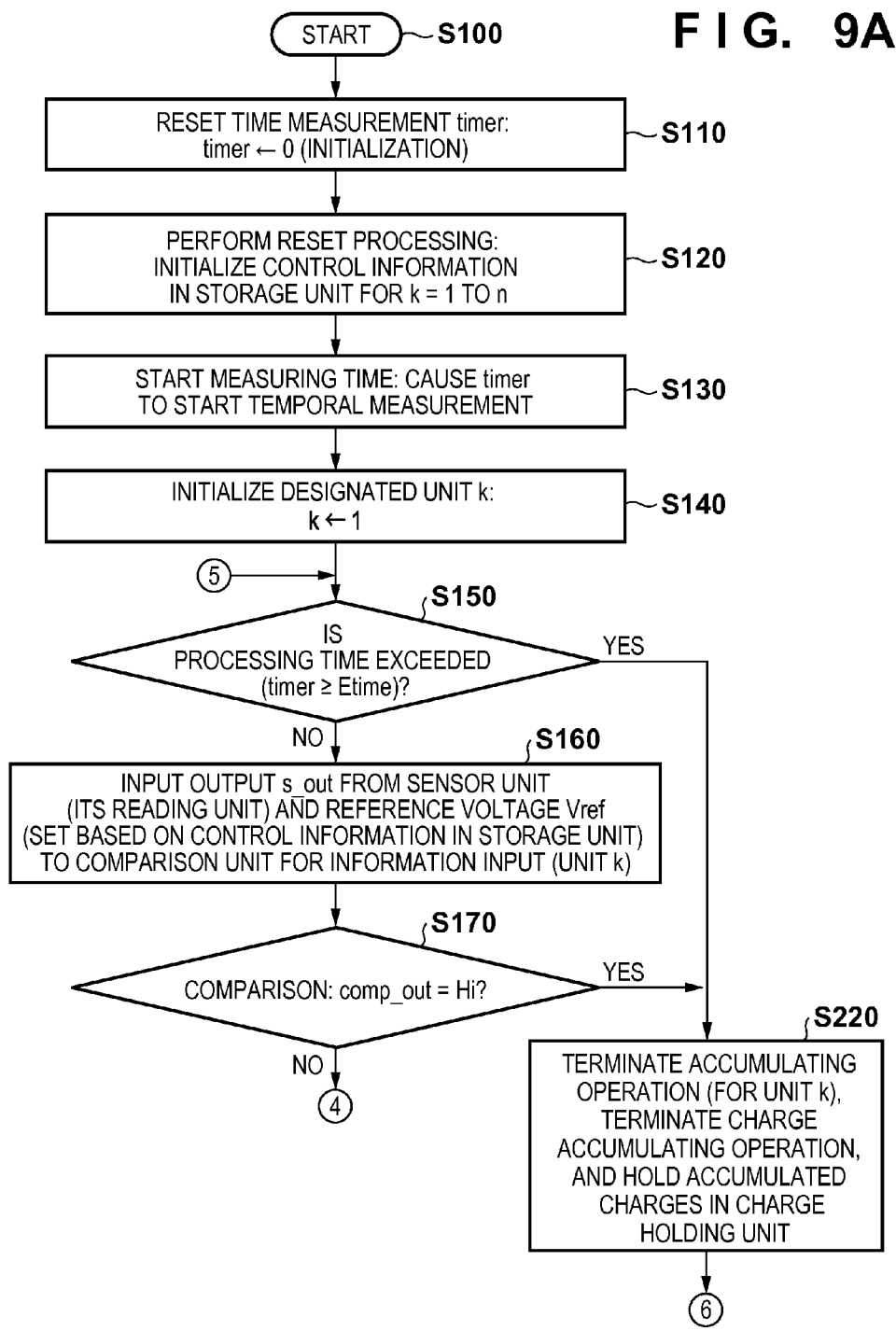
FIGS. 9A and 9B are flowcharts for explaining an example of the operation of the semiconductor device according to the second embodiment.
Figure 9B:
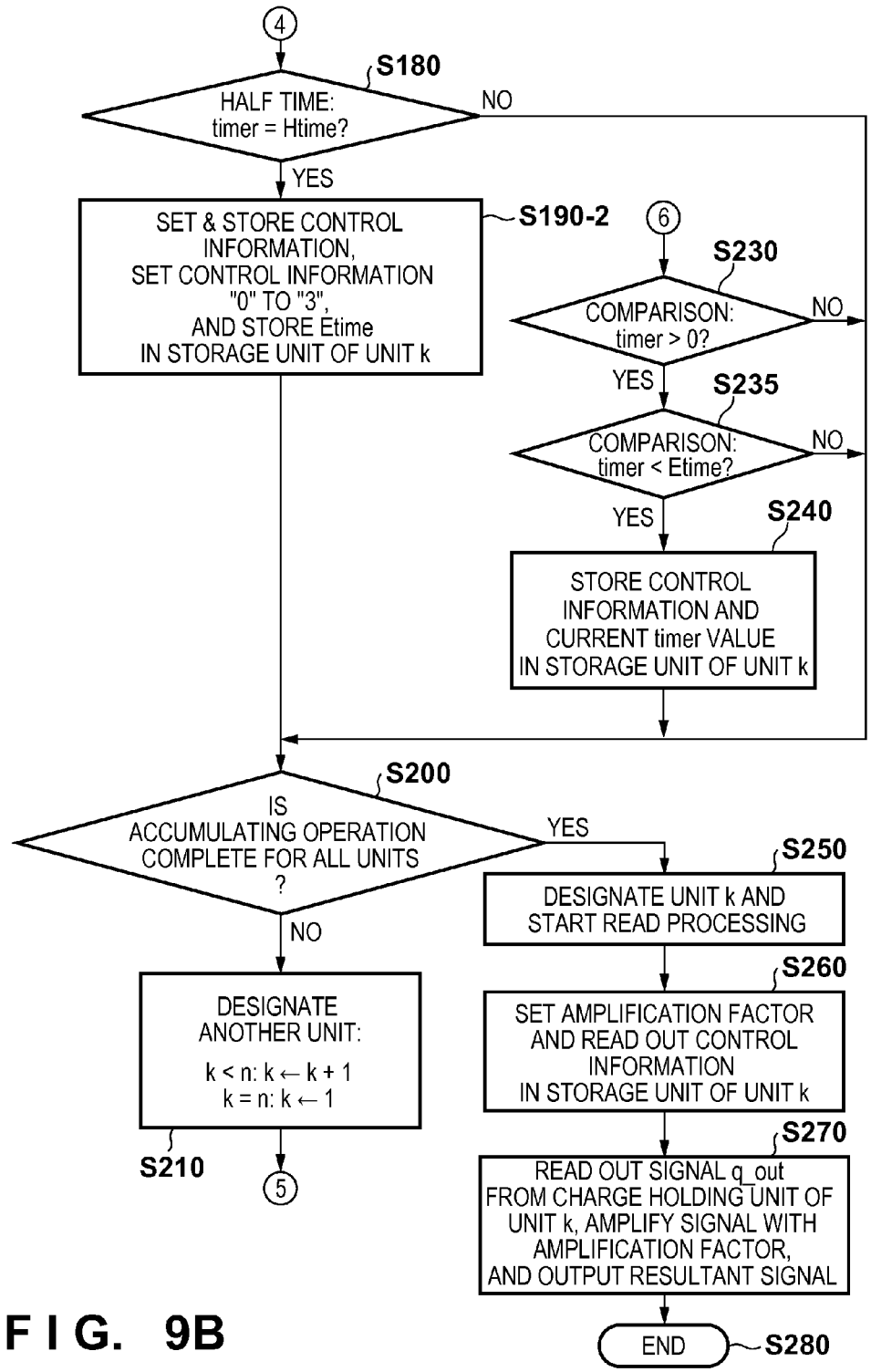
Figure 10:
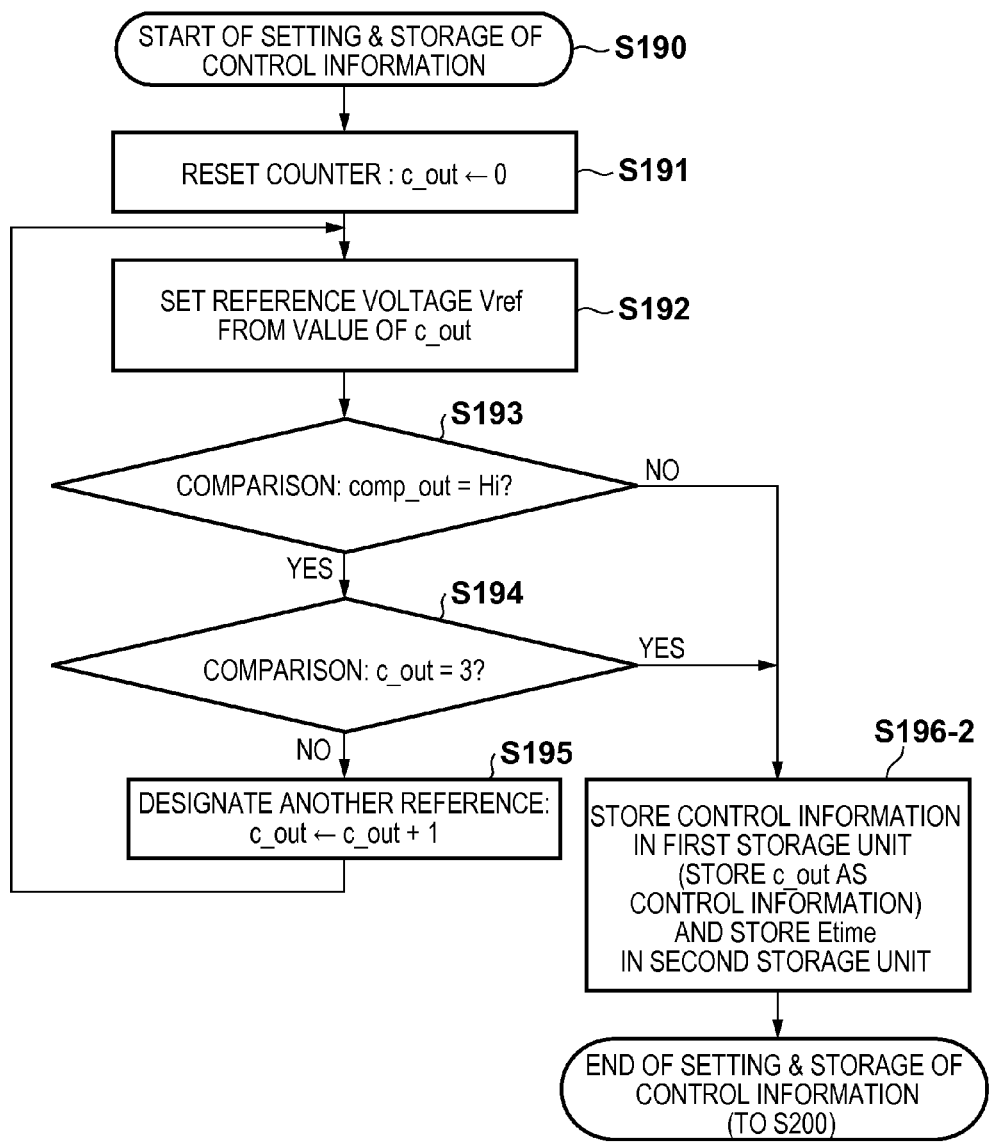
FIG. 10 is a flowchart for explaining part of the example of the operation of the semiconductor device according to the second embodiment.

FIG. 8 shows an example of the arrangement of the semiconductor device 1'. Note that a redundant description of portion described with reference to FIG. 3 will be omitted. This embodiment differs from the first embodiment in that the second storage unit 30$_k$ stores the timer value of a timer 152, and the device switches a selector 153 at the timing controlled by a controller 150 to allow to store Etime. This operation can be executed in accordance with the flowchart shown in FIGS. 9A and 9B. The processing from S100 to the step in which the timer value reaches Htime is the same as that in the flowchart shown in FIG. 4A.

If the timer value becomes equal to Htime in S180, the process advances S190-2. The operation in S190-2 can be performed by a program based on the flowchart shown in FIG. 10. The operation in S190-2 differs from the operation exemplified by FIG. 5B. That is, it is possible to store Etime in the second storage unit 30$_k$ in S196-2, instead of the value (Htime) of the timer 152 at this time point, by switching the selector 153 under the control of the controller 150.

When the timer value reaches Etime without termination of accumulating operation in any unit k, the process advances to S220 upon determination in S150, thereby forcibly terminating the accumulating operation. Since timer value>0 in S230, the process advances to S235. In S235, the device compares the timer value with Etime. In this case, since timer<Etime does not hold, the process advances to S200 upon skipping S240. If the device determines in S200 that there is any unit k which has not completed accumulating operation, the process returns to S150 through S210 to perform similar processing for the next unit k. As described above, when the timer value reaches Etime, the device causes all the units k which have not completed accumulating operation to terminate the accumulating operation upon skipping the storage processing for the storage units in S240. Thereafter, the process advances to S250 through S200 to perform the subsequent processing.

As described above, when the timer value reaches Htime, the semiconductor device 1' stores Etime in the second storage unit 30$_k$. When the timer value reaches Etime afterward, the device stores the timer value at this time point as information concerning the accumulation time in the second storage unit 30$_k$ in each unit k which has completed accumulating operation. On the other hand, the device skips the processing of storing information concerning the accumulation time in the second storage unit 30$_k$ in each unit k which has not completed accumulating operation. In this manner, the semiconductor device 1' can execute the operation shown in FIG. 7B. Although the above description concerns the operation to be performed when the luminance of an object is low, this embodiment can be applied in combination with the first embodiment.

Although the two embodiments have been described above, the present invention is not limited to them. Obviously, the objects, states, applications, functions, and other specifications of the present invention can be changed as needed, and other embodiments can implement the present invention. The sensor unit, for example, is formed as a CMOS image sensor, and may be implemented as any other types of sensors. In cooperation with or instead of the controller, an OS or the like operating on a computer may perform all or part of the operation control of each functional block described above.

The focus detection apparatus included in a camera has been described as a typical application example of the semiconductor device according to the embodiments described above. The concept of camera includes not only a device whose principal operation is to image but also a device (for example, a personal computer or portable terminal) additionally provided with an imaging function. The camera can include the above focus detection apparatus, a sold-state image sensor, and a processor which processes a signal output from the solid-state image sensor. The processor can include, for example, an A/D converter, and a processor which processes digital data output from the A/D converter. The processor may execute focus detection processing, and a calculation unit which executes the focus detection processing may be included in the focus detection apparatus. Changes can be made, as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-163071, filed Jul. 23, 2012, which is hereby incorporated by reference herein in its entirety.

What is claimed is:

1. A semiconductor device comprising a plurality of units, each including a sensor unit which accumulates charges upon photoelectric conversion and a storage unit which stores information, and a control unit which controls each of the plurality of units, wherein the control unit is configured to perform, for a selected unit of the plurality of units, a first operation of comparing a reference value with an output signal from the sensor unit, the output signal being based on the amount of accumulated charges, and a second operation of changing the information in the storage unit if the comparison result indicates that an output signal from the sensor unit reaches the reference value in the first operation, in a first period, the control unit performs the first operation for at least one of the plurality of units but does not perform the second operation for the at least one of the plurality of units even if the comparison result obtained by the first operation indicates that an output signal from the sensor unit reaches the reference value, and in a second period different from the first period, the control unit performs, for a selected unit of the plurality of units, the first operation, and the second operation if the comparison result obtained by the first operation indicates that an output signal from the sensor unit reaches the reference value.

2. The device according to claim 1, wherein the first period starts from a timing at which the accumulation starts.

3. The device according to claim 1, wherein the control unit does not perform, in the second period, the first operation and the second operation for a unit of the plurality of units, after the control unit determines that an output signal of that unit has reached the reference value in the first operation.

4. The device according to claim 1, wherein the control unit does not perform, in the first period, the first operation for a unit of the plurality of units, after the control unit determines that an output signal of that unit has reached the reference value.

5. The device according to claim 1, wherein the control unit presets the information stored in the storage unit upon start of the first period.

6. The device according to claim 1, wherein the information is configured to indicate an elapsed time from when the accumulation starts to when an output signal from the sensor unit reaches the reference value.

7. The device according to claim 1, further comprising a calculation unit,
   wherein each of the sensor units forms a pair of sensor arrays in which a plurality of photoelectric conversion units are arrayed, and
   the calculation unit performs phase-difference detection based on an output signal from one of the pair of sensor arrays and an output signal from the other of the pair of sensor arrays.

8. The device according to claim 1, further comprising a timer configured to measure an elapsed time to generate time information, wherein each of the plurality of units further includes a second storage unit configured to store the time information generated by the timer as information associated with an accumulation time required for accumulating charges in the sensor, and
   wherein the control unit initializes the time information of the timer and the time information in the second storage unit of the plurality of units to an initial value upon start of the first period, and
   wherein the first period is a period during which the timer outputs the initial value.

9. The device according to claim 1, wherein the first period is followed by the second period.

10. A camera comprising:
    a semiconductor device defined in claim 1;
    a solid-state image sensor; and
    a processor which processes a signal output from the solid-state image sensor.

11. A method of controlling a semiconductor device including a plurality of units, each including a sensor unit which accumulates charges upon photoelectric conversion and a storage unit which stores information, the method comprising:
    performing, in a first period, for at least one of the plurality of units, a first operation of comparing a reference value with an output signal from the sensor unit, the output signal being based on the amount of accumulated charges; and
    performing, in a second period different from the first period, for a selected unit of the plurality of units, the first operation, and a second operation of the comparison result obtained in the first operation indicates that an output signal from the sensor unit reaches the reference value,
    wherein in the first period, the second operation is not performed even if the comparison result obtained in the first operation indicates that an output signal from the sensor unit reaches the reference value.

12. The method according to claim 11, wherein the first period starts from a timing at which the accumulation starts.

* * * * *